(12) United States Patent
Bonner

(10) Patent No.: US 7,929,955 B1
(45) Date of Patent: Apr. 19, 2011

(54) MANAGING MULTIPLE CLI IDENTITIES

(75) Inventor: Thomas W. Bonner, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1103 days.

(21) Appl. No.: 11/380,870

(22) Filed: Apr. 28, 2006

(51) Int. Cl.
H04M 3/42 (2006.01)

(52) U.S. Cl. ........................ 455/415; 455/414.1; 455/567

(58) Field of Classification Search .................. 455/415, 455/414.1, 567
See application file for complete search history.

(56) References Cited

U.S. PATENT DOCUMENTS

| 5,754,635 | A |   | 5/1998  | Kim                      |
|-----------|---|---|---------|--------------------------|
| 5,950,138 | A | * | 9/1999  | Norimatsu ........ 455/551 |
| 6,018,577 | A | * | 1/2000  | Roach, Jr. ........ 379/229 |
| 6,049,713 | A |   | 4/2000  | Tran et al.              |
| 6,094,573 | A |   | 7/2000  | Heinonen et al.          |
| 6,597,905 | B1|   | 7/2003  | Hijii                    |
| 6,928,154 | B1|   | 8/2005  | Cheaito et al.           |
| 6,996,220 | B2|   | 2/2006  | Kowalski                 |
| 7,016,482 | B2|   | 3/2006  | Moss et al.              |
| 7,058,415 | B2|   | 6/2006  | Bushnell et al.          |
| 7,330,732 | B2| * | 2/2008  | Wilborn et al. ...... 455/502 |
| 2005/0026648 | A1 |   | 2/2005 | Belkin et al.           |
| 2005/0070265 | A1 | * | 3/2005 | Korpinen ......... 455/419 |
| 2005/0105706 | A1 | * | 5/2005 | Kokkinen ........ 379/201.01 |
| 2006/0013375 | A1 |   | 1/2006 | Smith et al.            |
| 2006/0154662 | A1 | * | 7/2006 | Kil et al. ........ 455/435.1 |
| 2006/0223586 | A1 | * | 10/2006 | Noma ............ 455/560 |

* cited by examiner

Primary Examiner — Nghi H Ly

(57) ABSTRACT

A caller identity provision system comprises a receiver component that receives a call request, the call request originates from a mobile handset that is associated with multiple numbers. An analysis component analyzes the call request and selects a caller line identification (CLI) from amongst a plurality of CLIs to provide to a called party that is a subject of the call request. For instance, the mobile handset and/or a network server can comprise the receiver component and/or the analysis component.

28 Claims, 15 Drawing Sheets

MANAGING MULTIPLE CLI IDENTITIES

BACKGROUND

The mobile telephone industry has been associated with tremendous growth over the last several years. For instance, in the recent past, mobile telephones were only available to those of highest economic status due to service costs and costs associated with mobile phones. Moreover, network coverage was not extensive enough to enable robust service. In particular, only areas associated with dense population were provided with extensive wireless network coverage. Still further, the mobile phones that could utilize the networks to communicate were quite bulky, causing portation of the phone over any significant distance to be difficult at best. In more detail, antennas associated with these phones could be over a foot in length, thus making it difficult to utilize the phones in automobiles or other congested areas.

In contrast, today's portable phones (and other portable devices) can be utilized as full-service computing machines. For example, many of the most recent and advanced mobile phones can be associated with word processing software, accounting software, and various other types of software. Furthermore, network coverage has expanded to cover millions, if not billions, of users. Additionally, mobile phones have decreased in both size and cost. Specifically, modern mobile phones are often small enough to slip into an individual's pocket without discomforting the individual. Furthermore, many mobile network service providers offer phones at extremely low cost to customers who contract for service with such providers.

Advances in technology relating to mobile devices in general, and mobile phones in particular, continue to occur. For example, recently mobile telephones have been designed to communicate over disparate networks and/or between licensed and unlicensed spectra. In more detail, a dual mode handset can connect to a cellular network to effectuate communications between a user of the mobile phone and another phone device, and can further connect via WiFi, Bluetooth, and the like to a wireless local access network (LAN) and thereafter utilize the Voice over Internet Protocol (VoIP) (or other suitable protocol) to effectuate communication between users. Use of VoIP is often desirable to users as it is associated with less cost than employing a cellular network. In fact, some users may consider phone calls made over VoIP (or other IP-based network) completely free, despite the fact that they pay for Internet service.

Implementation of this dual mode service is due at least in part to the Third Generation Partnership Project (3GPP), which have created specifications that define a mechanism that provides signal integrity for session initial protocol (SIP) signals between an IP multimedia subsystem (IMS) (P-SCCF) and user equipment (UE) (e.g., a mobile phone, a personal digital assistant, ... ). This integrity prevents identity spoofing, man-in-the-middle attacks, and the like. The IMS represents a 3GPP and 3GPP2 effort to define an all-IP-based wireless network as a replacement for the various voice, data, signaling, and control network elements currently in existence. Furthermore, the IMS enables support for IP multimedia applications within the Universal Mobile Telecommunications System (UMTS). The UMTS is a 3G broadband packet-based transmission of text, digitized voice, video, and multimedia that offers a consistent set of services to mobile computer and phone users regardless of their physical location.

The telecom industry is currently shifting towards all IP-systems, thereby rendering dual mode service handsets an important tool (as they are compatible with existing cellular systems and emerging IP-systems). This shift is driven by desires to reduce costs and create new streams of revenue while protecting an operator business model. IMS is a new service domain that facilitates this shift by enabling convergence of data, speech, and network technology over an IP-based infrastructure. For users, IMS-based services enable transmittal and receipt of various data at significantly reduced cost, including voice, text, pictures, video, and/or any combination thereof in a highly personalized and secure manner. In summary, IMS is designed to bridge the gap between existing, traditional telecommunications technology and Internet technology that increased bandwidth does not provide.

As stated above, these emerging IP-based technologies have created demand for dual mode services, and thus for dual mode handsets. Using this technology, users can employ WiFi to effectuate voice calls, transmission of data, and the like. In more detail, a user can connect to a LAN by way of WiFi. Upon such connection, users can employ services offered by their service provider.

SUMMARY

The following presents a simplified summary in order to provide a basic understanding of some aspects of the claimed subject matter. This summary is not an extensive overview, and it is not intended to identify key/critical elements of the claimed subject matter or to delineate the scope thereof. Its sole purpose is to present some concepts in a simplified form as a prelude to the more detailed description that is presented later.

The claimed subject matter relates to selectively providing caller identification information to a called party when a calling party is associated with multiple identities (phone numbers). For instance, dual-mode handsets may be associated with multiple numbers, such as personal numbers, business numbers, family numbers, etc., and thus it is desirable to associate correct caller identification data with outgoing calls. To that end, a subscriber can dial a number, use voice commands, select a contact, or the like in connection with requesting that a certain individual be contacted. The call request can be analyzed to determine if caller identification information has previously been associated with the number to be called. For instance, a user can categorize contacts as personal contacts, business contacts, and/or any other suitable contacts. Such categorization can be retained upon a mobile handset, upon a network server, or in any other suitable location. If the contact has been categorized, then caller identification information related to the assigned category can be provided to a called party.

If the desirably called party has not been previously categorized, then, for instance, default caller identification information can be provided to the called party. In another example, a user interface can be provided to a user prior to connecting the call, requesting that such user select caller identification information to provide with the call. Additionally or alternatively, call history can be analyzed and caller identification information can be selectively provided with the call. For instance, if a user has dialed several numbers in an area code that are business contacts, and later places another call in such area code, it is probable that the dialed number is a business contact (and caller identification information can be provided accordingly). Similarly, temporal analysis can be undertaken. For instance, if a user typically calls business contacts between 3:00 p.m. and 4:00 p.m., and such user dials a new number within such time, it is probable that the dialed number is a business contact (and caller identification information can be provided accordingly).

Dynamic billing can additionally be undertaken in connection with determining caller identification information. Pursuant to an example, an enterprise may provide an individual with a phone, and may pay for calls made to business contacts and received from business contacts. It may be desirable, however, to obligate the user to pay for personal calls (which may or may not be billed at a different rate). Still further, billing can vary as a user enters and leaves ranges of access points or other distinctive conditions detected by the network.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
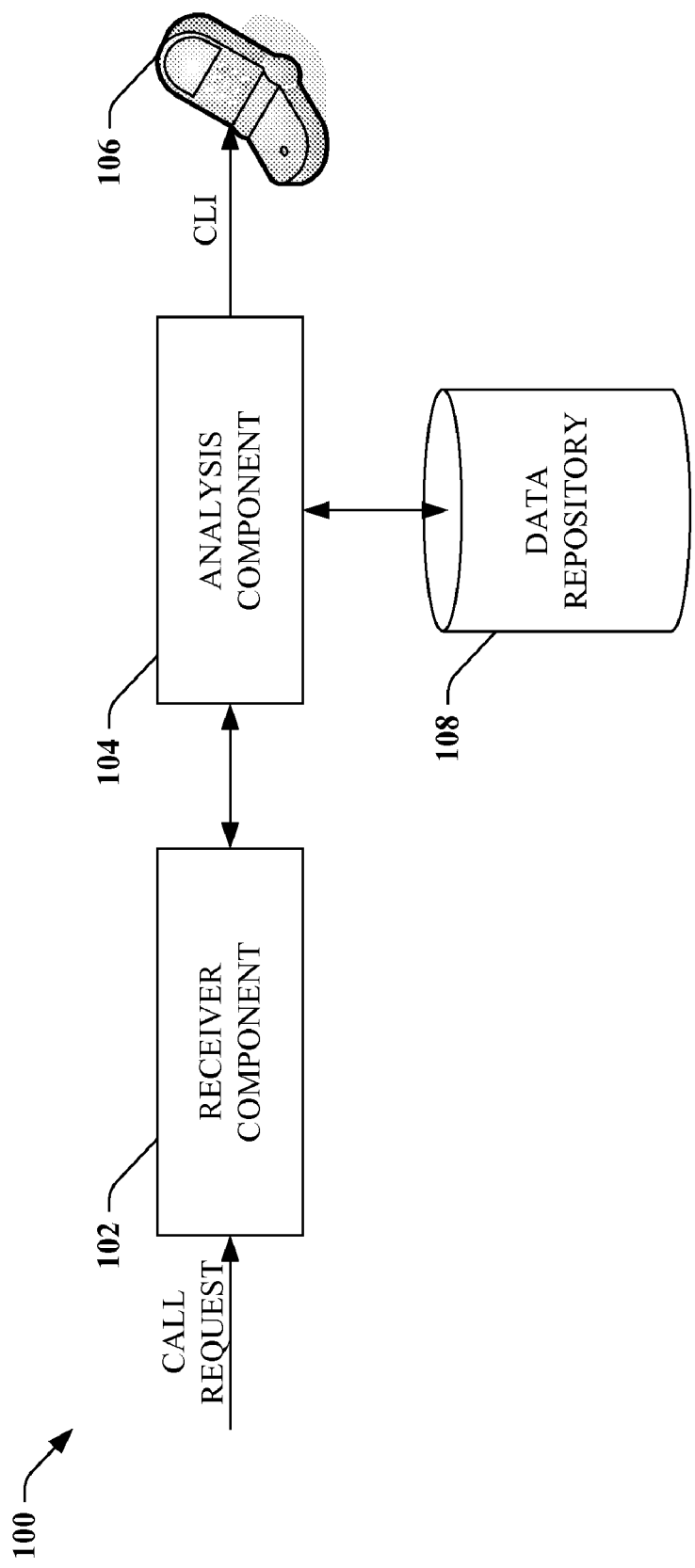
FIG. 1 is a high-level block diagram of a system that selectively provides a caller line identification (CLI) from amongst a plurality of possible CLIs to a called party.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Turning now to the drawings, FIG. 1 illustrates a system 100 that can be utilized to determine which of several calling line identifications (CLIs) to provide to a called party. While the acronym CLI is used herein, it is understood that the claimed subject matter is intended to encompass any suitable caller identification information, which can also be referred to as Caller Display, Caller Line Identification Presentation (CLIP), Call Capture, Calling Line Identity (CLID), Call Display (CID), Automatic Number Identification (ANI), etc. Thus, CLI is just one example of caller identification information that is utilized for sake of brevity and clarity, but any suitable caller identification information is contemplated and intended to fall under the scope of the hereto-appended claims. The system 100 includes a receiver component 102 that receives a request to place a call. For instance, a push button on a dual-mode mobile telephone can be depressed after a contact to be dialed has been selected or a series of numerical values (a phone number) have been provided. In still another example, the call request can be a request based on voice commands, where the voice commands can include a series of numbers or name of a contact that is retained within a phone or upon a network (e.g., a circuit-switched network). A mobile device, such as a mobile telephone, a personal digital assistant (PDA), a Smartphone, or the like can comprise the receiver component 102. In another example, a network can include the receiver component 102, such that a call request from a mobile device is received, for example, at a network server.

The receiver component 102 can be communicatively coupled to an analysis component 104, which can analyze the call request to determine an appropriate CLI to apply to the requested call. In more detail, multi-mode services provided by wireless service providers may include and support multiple telephone numbers with each individual subscription. Thus, a single dual-mode handset of a subscriber may be associated with multiple numbers, for instance, such that one number corresponds to a business number, one number corresponds to a personal number, one number corresponds to a number utilized for calling family members, etc. The analysis component 104 can cause a proper identity to be displayed on a caller ID of a called party 106.

In one example, the analysis undertaken by the analysis component 104 can be static and based upon designations provided to contacts within the dual mode-handset. For instance, a user can designate CLIs with respect to individuals within a contacts list, and such designations can be retained locally upon the dual-mode handset and/or upon a network server within a data repository 108. Thereafter, when the user calls a contact, a CLI that has been previously associated with the contact can be provided to a recipient of the call. Pursuant to a specific example, a user can bring up a contacts list, and can select a contact to call. Previously, the user has characterized the selected contact as a business contact—thus, the CLI provided to the user will be a business identity or number (rather than a personal identity or number). Again, such characterization can be stored locally upon the dual-mode handset and then provided to a wireless (e.g., GSM) network at a time the call is placed, such that the recipient of a call will receive a desired CLI (from amongst a plurality of numbers or identities).

If the analysis component 104 determines that the call request is associated with a number that has not been associated with a CLI, then the analysis component 104, for example, can assign a default number or identity to the called party 106. Such number can then be assigned and stored within the data repository 108 and associated with the default number until altered by a user or a network. Again, such assignment of a default number can occur within a multi-mode device or within a network associated with the multi-mode device. In another example, the analysis component 104 can make a dynamic and intelligent decision regarding which CLI to provide to the called party 106. For example, the analysis component 104 can analyze a call history that is retained within the data repository 108, and can assign a CLI with respect to the called party based at least in part upon such analysis. For instance, if a user makes business calls to a particular area code, and dials a new number with such area code but is not assigned a CLI, the analysis component can automatically assign a business identity to such number. The analysis component 104 can undertake a probabilistic analysis with respect to associating a CLI with a call request, such that a CLI associated with a highest probability is assigned to a call. The correlation between the called number and the appropriate CLI can be retained within the data repository 108.

In summary, dual-mode devices may be associated with multiple phone numbers, such that incoming calls can have different numbers, yet be delivered to the same device, and outgoing calls can have multiple possible CLI associated therewith. The analysis component 104 aids in associating an appropriate CLI to outgoing calls, such that if a business contact is called, appropriate caller identification is provided to the called party. Similarly, if a personal contact is called, a number or identity that is associated with the dual-mode device's personal number will be displayed upon an end device. Additionally, it is to be understood that management of multiple CLIs is independent of network and/or radio technologies, as the claimed subject matter may apply to any suitable technology that provides a two or more party voice session.

Figure 2:
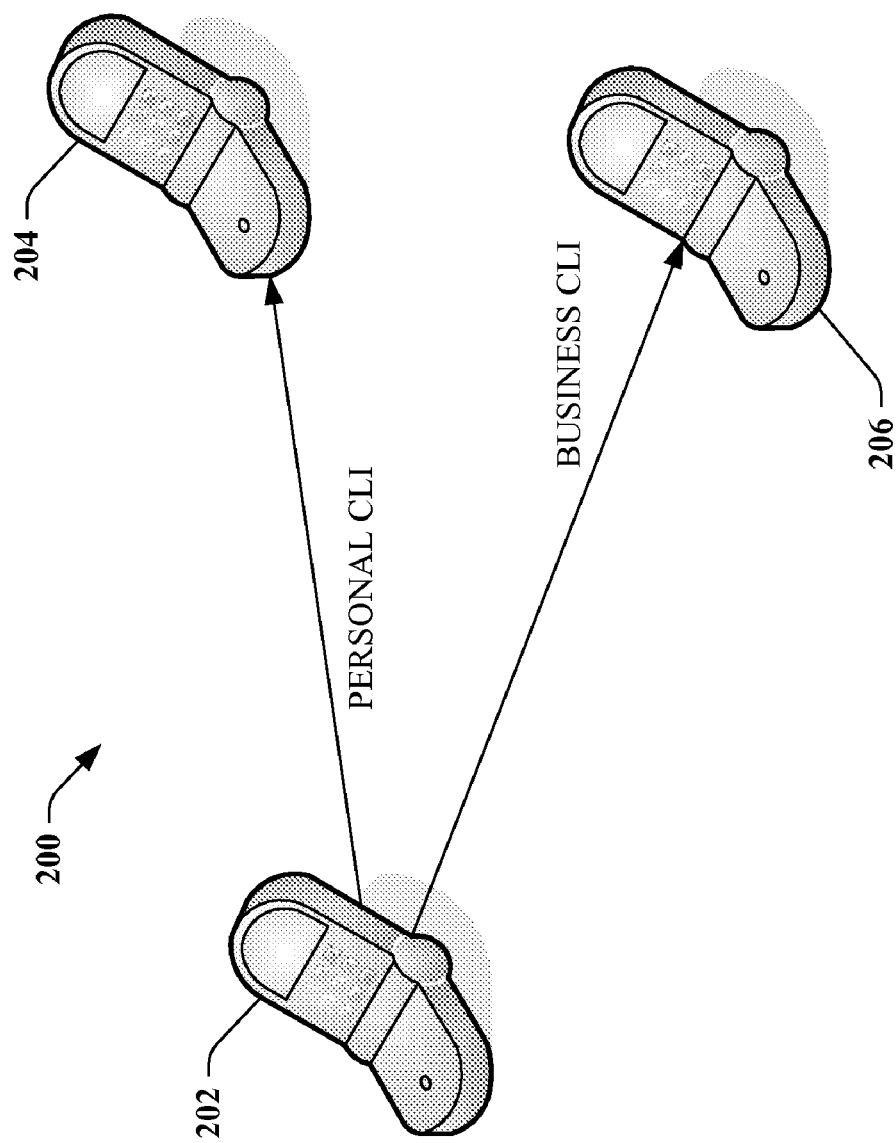
FIG. 2 illustrates a dual-mode handset that can utilize multiple phone numbers to place phone calls.

Now turning to FIG. 2, an example arrangement 200 of multiple mobile devices is illustrated. A first device 202 can be a dual-mode device, which may be associated with multiple phone numbers. Dual-mode devices can connect by way of WiFi, Bluetooth, or other suitable protocol to a broadband network, and can then utilize such network to send and receive voice calls as well as data. Dual-mode devices are also equipped to utilize conventional cellular networks in areas not covered by an access point associated with a particular dual-mode device. In an example of typical usage of a dual mode device, an enterprise may have their own network infrastructure, and my wish that their employees utilize the internal network for phone calls and data transmittal to reduce telephone bills. Outside areas covered by such network, however, employees can still communicate through use of a cellular network (e.g., GSM).

Second and third communication devices 204 and 206, respectively, can receive a call from the first device 202, which is associated with multiple telephone numbers. For instance, the second communication device 204 can be associated with a personal contact of the operator of the first communications device 202; accordingly, a number or identity associated with a personal number of the first communication device 202 should be displayed to the owner of the second communication device 204. Similarly, the third communication device 206 can be associated with a business contact of the operator of the first communications device 202. Therefore, a number or identity provided to the third communication device 206 when called by the first communication device 202 should be a business number or identity of the first communications device 202. While shown as portable devices, it is understood that the second and third communications devices 204 and 206 can be landline phones, mobile phones, or any other suitable communication devices. Additionally, caller identity displayed in connection with the devices 204 and/or 206 can be visual in nature, such as a phone number or identity, and/or can be output audibly.

Figure 3:
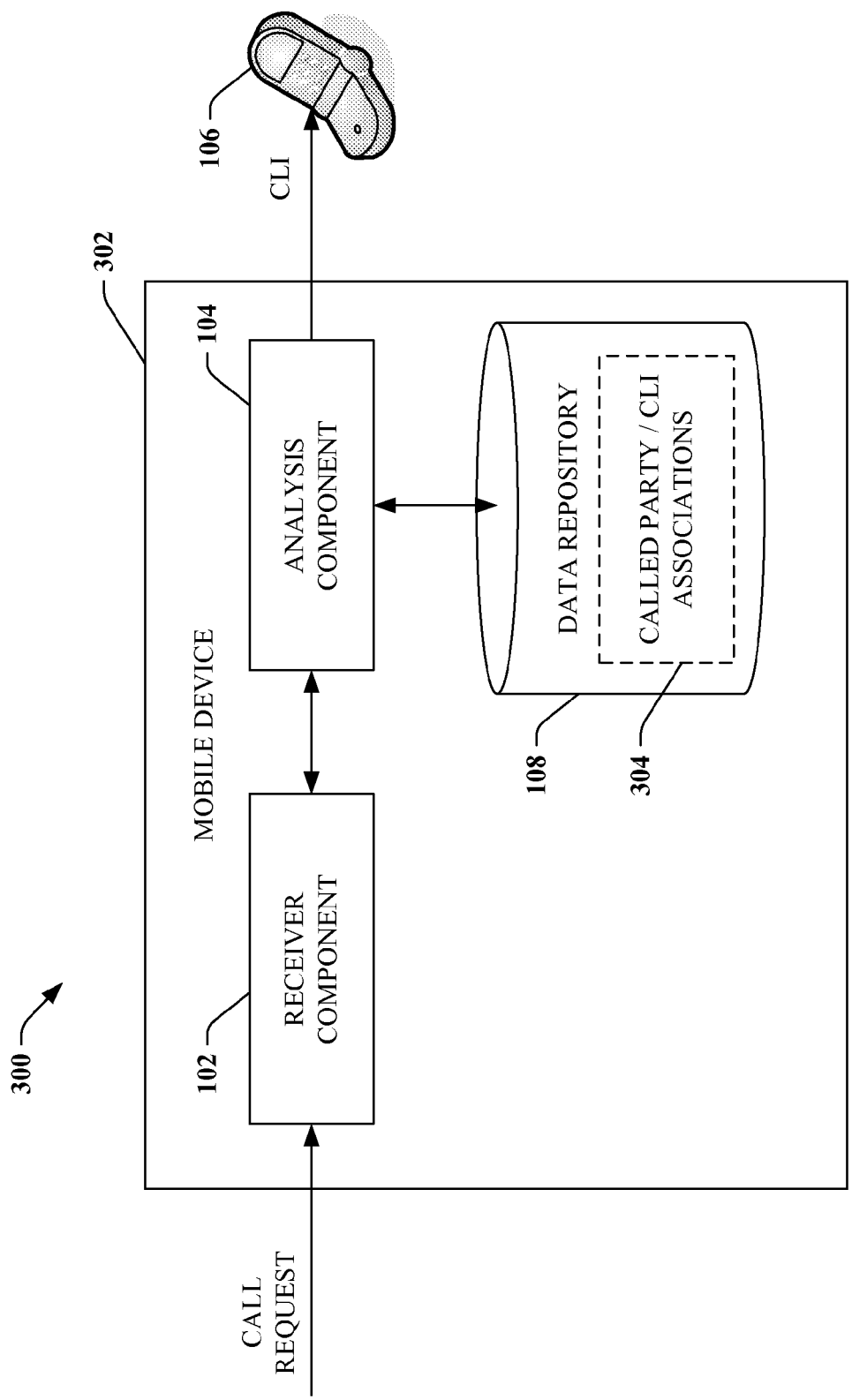
FIG. 3 is block diagram of a system that facilitates selective provision of a CLI by a mobile device.

Referring now to FIG. 3, a system 300 that facilitates selection and output of a CLI from amongst a plurality of CLIs is illustrated. The system 300 includes a mobile device 302, which can be a dual-mode handset (telephone). The mobile device 302 can be associated with multiple telephone numbers, such that different parties can utilize different numbers and reach a same operator. Similarly, outgoing calls may be associated with different caller identification data, wherein calls made to different parties may desirably have different CLIs associated therewith. To that end, the mobile device 302 includes the receiver component 102 that receives a call request (e.g., a request to call a particular individual, phone line, company, . . . ). The call request can be a user selecting a contact from a contact list through selection of one or more push-buttons, use of speed dial (e.g., maintaining pressure on a single key for a short period of time), use of voice commands, or any other suitable manner for initiating a call to the called party 106.

The receiver component 102 is communicatively coupled to the analysis component 104, which analyzes the call request received by the receiver component 102. More particularly, the analysis component 104 analyzes the number or identity that is the subject of the call request, and searches the data repository 108 for the number or identity. The data repository 108 includes called party/CLI associations 304, such that the analysis component 104 can quickly determine an appropriate CLI to associate with the number or identity within the call request. If the called party/CLI associations 304 do not include a number or identity relating to the call request, the analysis component 104 can associate an outgoing call with a default CLI. Additionally or alternatively, the analysis component 104 can make a real-time inference relating to a particular CLI to provide to the receiving party 106 given the call request. As used herein, the terms "inference" or "to infer" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

In one example, an operator of the mobile device 302 may frequently make business calls to various enterprise numbers, which each have a same area code (and may have other similar digits as well). If the called party 106 is within the area code associated with the enterprise numbers, the analysis component 104 can infer that a business CLI should be provided to the called party 106. Thereafter, the inferred CLI and the number can be retained, for instance, within the called party/CLI associations 304 within the data repository 108. For instance, the data repository 108 can be a SIM card, a hard drive within the mobile device 302, a flash card, or any other suitable removable and/or non-removable media.

Figure 4:
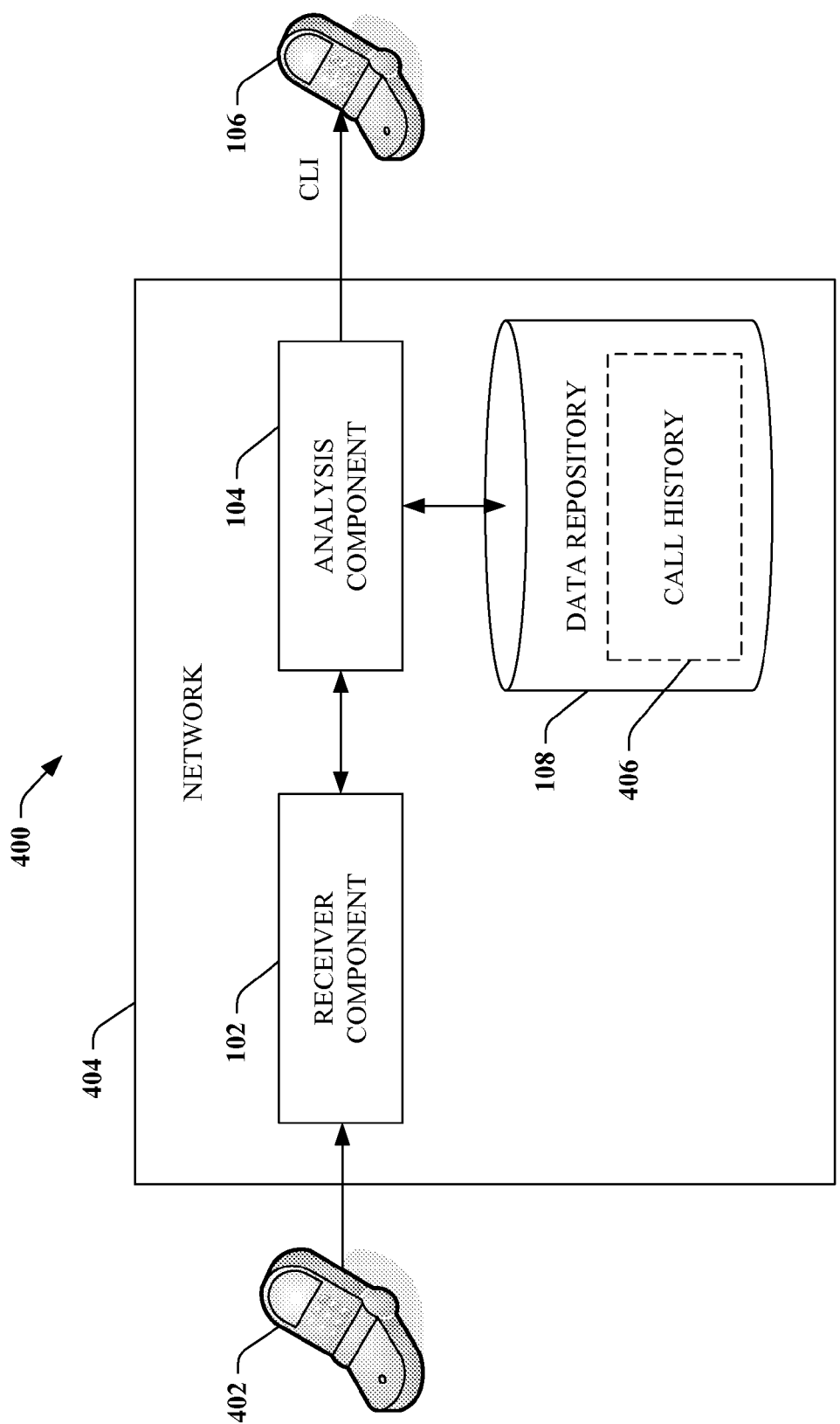
FIG. 4 is a block diagram of a system that selectively provides a CLI to a called party.

Turning now to FIG. 4, a system 400 for appending an appropriate CLI to a mobile originated call is illustrated. The system 400 includes a dual-mode handset 402 that can be associated with multiple phone numbers (e.g., a business number, a personal number, a family number, . . . ). The dual mode handset 402 can employ a wireless network 404 to effectuate deliverance and receipt of voice calls and data, such as image data, text messages, audio data (e.g., music files), and the like. The network 404 can be a GSM network, a Code-Division Multiple Access (CDMA) based network, or any other suitable wireless network. The network 404 can, for instance, authenticate the dual mode handset 402 when it requests dual-mode services, and can cause incoming and outgoing calls to be routed over a broadband network, such as a cable network, a DSL network, a WiMAX network, and the like.

In this example system 400, the network includes the receiver component 102, the analysis component 104, and the data repository 108. For instance, a subscriber can select a number, contact, dial a number, use speed dial, or the like to generate a call request that is received at the network 404 by the receiver component 102. The analysis component 104 can then analyze the request and provide an appropriate CLI to the called party 106. In an example, the call request received at the receiver component 102 can include metadata associated with the called party 106, indicating a CLI to be provided to the called party 106. Additionally or alternatively, the analysis component 104 can access the data repository 108 and utilize contents thereof to determine an appropriate CLI to provide to the called party. Thus, when the called party receives indication of an incoming call (phone ringing, phone vibrating, phone flashing, etc.), the called party 106 will also receive data identifying the calling party 402. The analysis component 104 can, as described above, access call history 406 within the data repository 108 and dynamically infer which of several CLIs to provide to the called party 106. Also, the analysis component 104 can provide a default CLI to the called party 106, and the default CLI can be associated with the called party 106 in the future until changed by the user. In more detail, a particular CLI can be designated as a default CLI, such that if a call is made and a CLI is not statically or dynamically assigned, the default CLI can be assigned. Moreover, an assigned CLI can be overridden through use of the default CLI on an ad hoc basis.

Figure 5:
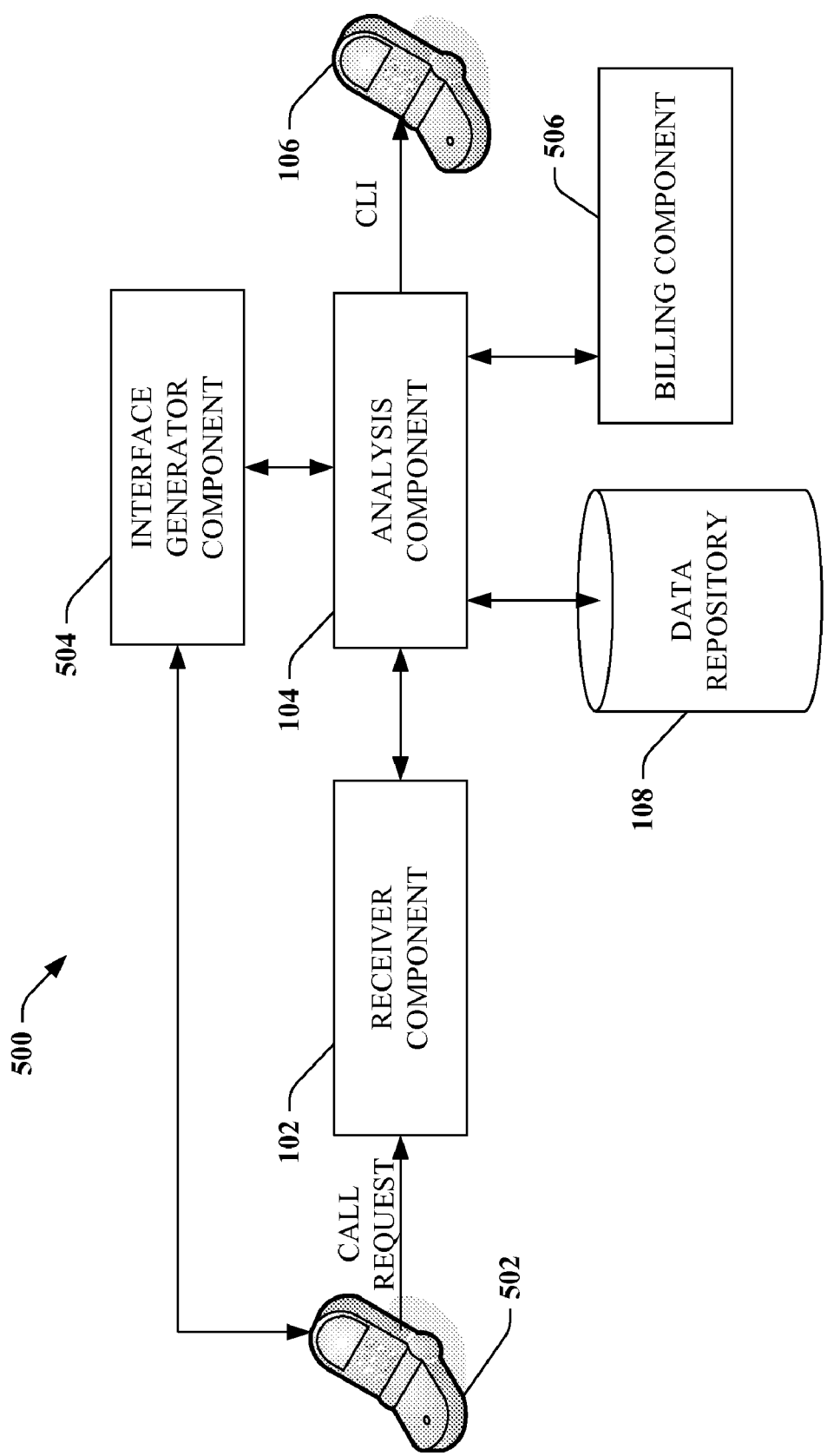
FIG. 5 is a block diagram of a system that facilitates performing billing based upon a CLI associated with a called party.

Now referring to FIG. 5, a system 500 that facilitates selectively providing a CLI from amongst a plurality of available CLIs to the called party 106 is illustrated. As described above, dual-mode handsets can be associated with several numbers, thus rendering it important to provide a correct CLI to parties called through utilization of dual mode handsets. The system 500 includes the receiver component 102, wherein such component 102 receives call requests made by a dual mode handset 502. The call request can then be passed to the analysis component 104, which can be utilized in connection with selecting a CLI to provide to the called party 106. For instance, the analysis component 104 can receive the call request and then access the data repository 108 to determine if the called party 106 has previously been assigned an appropriate CLI. If yes, the analysis component 104 can provide such CLI to the called party 106.

If the called party 106 has not been assigned a CLI, an interface generator component 504 can be utilized to provide a user with an opportunity to assign a CLI to the called party 106. While shown as being separate and outside of the dual mode handset 502, it is understood that one or more of the receiver component 102, the analysis component 104, the data repository 108, and the interface generator component 504 can be included within the dual mode handset 502. Additionally or alternatively, one or more of such components can be located on network devices, such as network servers. An interface provided by the interface generator component 504 can enable a user to select a CLI to associate with the called party 106, and such CLI (and a number or contact associated with the called party 106) can be retained within the data repository 108. Moreover, the interface generator component 504 can provide an interface that can receive and interpret voice commands from a user, and a CLI can be associated with the called party 106 based upon such voice commands. Additionally, the interface generator component 504 can create an interface that can be used in connection with a pressure-sensitive screen, such that use of, for instance, a stylus can enable a user to select a CLI to associate with the called party 106.

The analysis component 104 can additionally be associated with a billing component 506 that can bill a subscriber associated with the dual mode handset 502 based upon determinations made by the analysis component 104. Pursuant to one example, the dual mode handset 502 can be utilized in connection with a particular enterprise, such that business calls made by the subscriber can be billed to the enterprise. Similarly, calls made to friends or family members may be desirably billed to the subscriber (rather than the enterprise). The billing component 506 can track calls made to different parties that are associated with different CLIs and automatically bill based upon such tracking. In another example, the billing component 506 can bill at different levels when the dual mode handset 502 is handed off from an access point to a wireless base station, for instance. More particularly, the dual-mode handset 502 may travel outside of a range of an access point, and thus may need to utilize conventional wireless apparatuses to continue with a phone call or receive/transmit data. The billing component 506 can bill at different rates depending on whether the dual-mode handset 502 is utilizing a broadband network or conventional wireless apparatuses to undertake communications/data exchange. Thus, the billing component 506 can bill different subscribers/entities (an individual and an enterprise, for example) at different rates depending on a CLI associated with calls made by the dual mode handset 502 and services being utilized by the dual mode handset.

Figure 6:
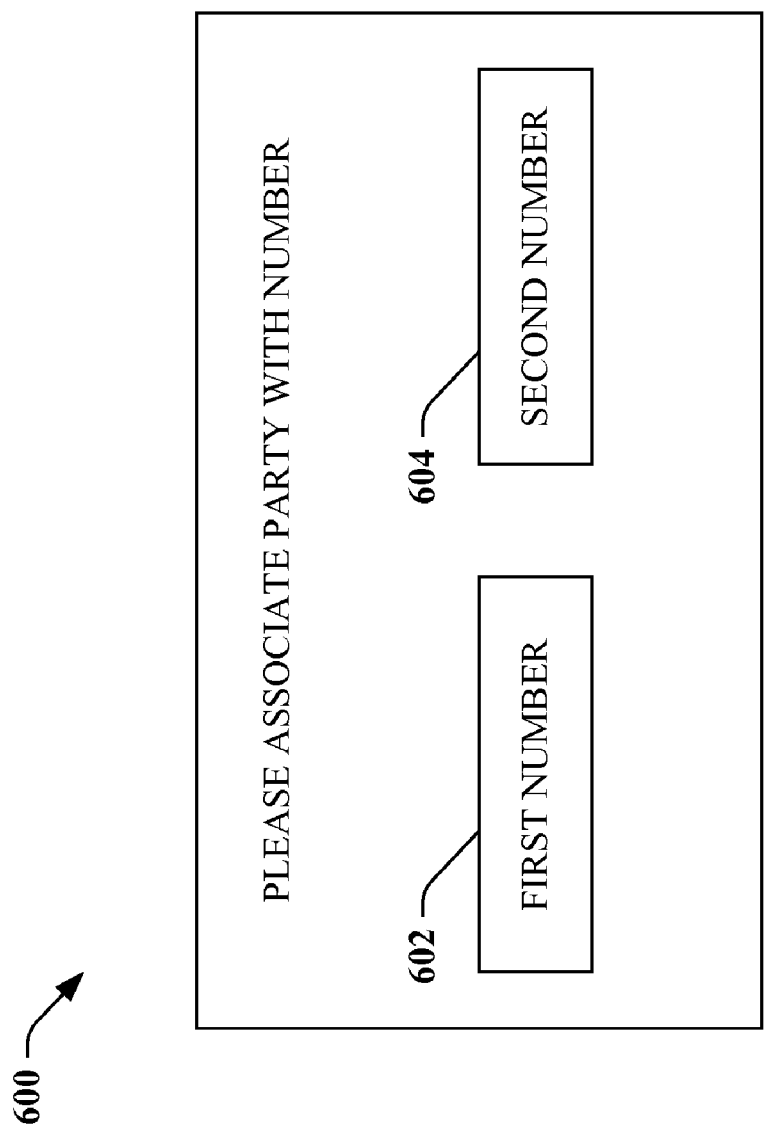
FIG. 6 illustrates an example graphical user interface that enables a user to associate a called party with a CLI.

Now turning to FIG. 6, an example interface 600 that can be provided to a dual-mode handset is illustrated. As stated supra, dual-mode handsets may be associated with multiple numbers, and it may be desirable to assign specific CLIs to contacts or called parties. If a user calls a number that is not associated with a particular CLI, the interface 600 can be provided to such user. The interface 600 can include text or graphics that directs a user with respect to how to assign a CLI to the called party. Additionally or alternatively, directions can be audibly provided to a subscriber. In the example interface 600, a subscriber is asked to select between two different numbers 602 and 604 associated with the dual mode handset. The selection can be made, for instance, by depressing one or more keys that relate to the two numbers 602 and 604. In another example, a stylus or other suitable instrument can be used to depress a graphical icon (button) on a pressure-sensitive screen. In yet another example, a subscriber can proffer voice commands to enable a CLI to be associated with an outgoing call.

Figure 7:
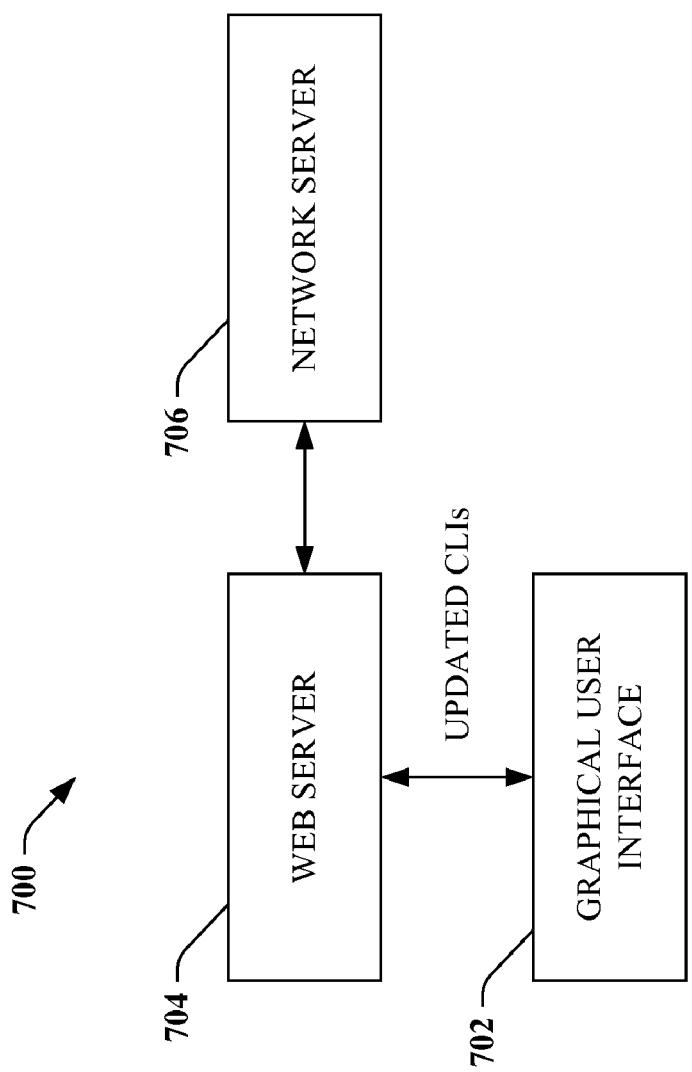
FIG. 7 is a block diagram of a system that enables a user to utilize the Internet to associate contacts with CLIs.

Referring now to FIG. 7, a system 700 that facilitates assigning a CLI or CLIs to one or more contacts is illustrated. The system 700 includes a graphical user interface 702 that enables a user to associate one or more called numbers or contacts with a CLI or CLIs. For instance, a user can enter a first contact or number in a field and then provide or select an appropriate CLI in a corresponding field (through text entry, selection by way of pull-down menus, radio buttons, etc.). The user selections can then be provided to a web server 704, which can be employed to transfer such selections to a network server 706 (a server maintained by a wireless service provider). Thereafter, when a user utilizes the dual-mode handset, an appropriate CLI will be assigned to called parties. The system 700 enables a user, through use of a computing device, such as a PC, to update or assign CLIs to specific numbers in bulk.

Figure 8:
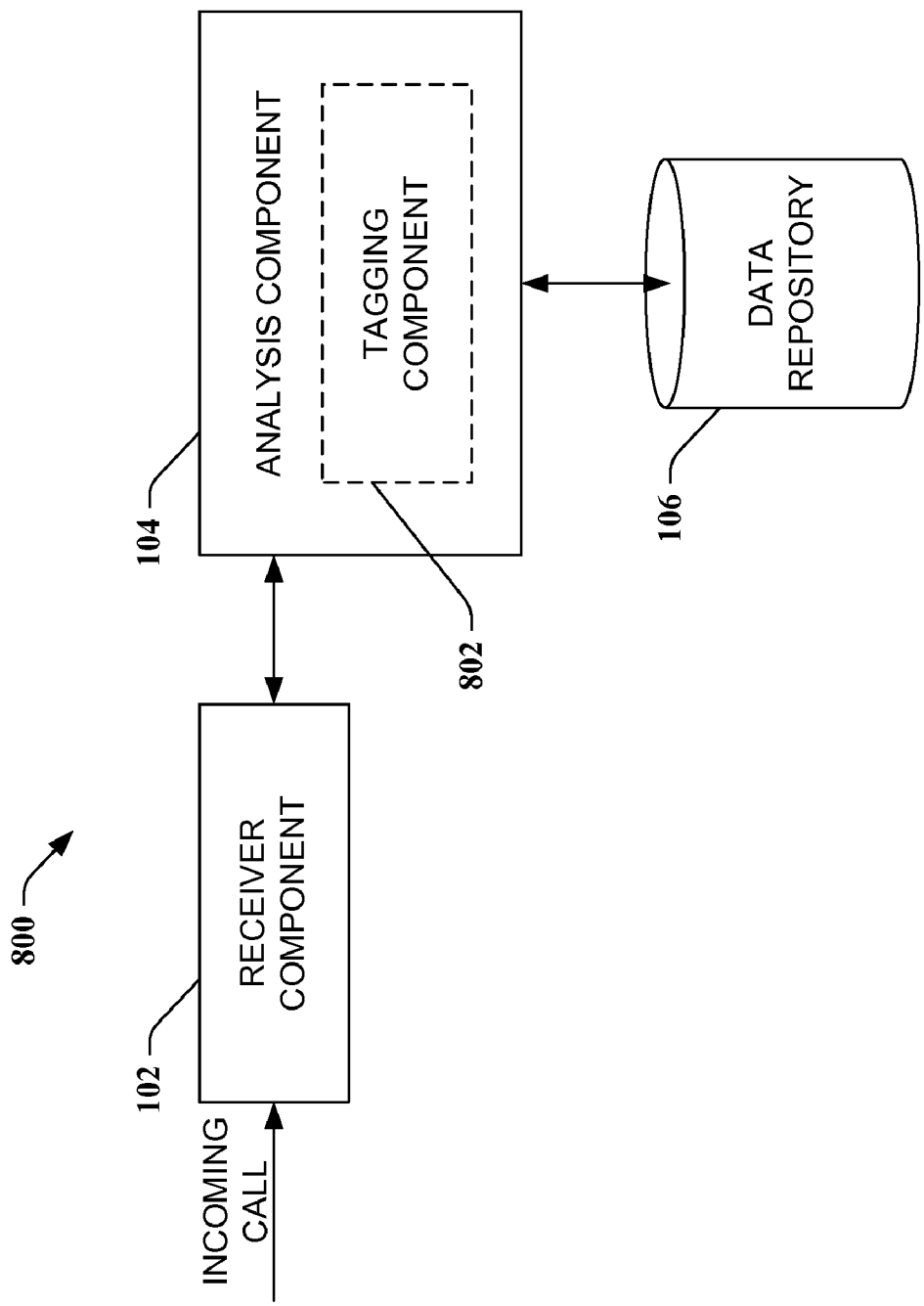
FIG. 8 is a block diagram of a system that automatically associates numbers with CLIs.

Now turning to FIG. 8, a system for assigning a CLI to a number or contact is illustrated. The system 800 includes the receiver component 102, which receives an incoming call. The incoming call is directed towards one of several numbers associated with a dual-mode handset. The analysis component 104 receives the incoming call and determines a number (e.g., personal, business, family, . . . ) that the incoming call utilized to contact the individual associated with the dual-mode handset. The analysis component 104 includes a tagging component 802 that tags the number of the incoming call (CLI) with metadata that indicates how to categorize such caller. Pursuant to a particular example, a caller with a number 111-222-3333 can attempt to contact the dual-mode handset by way of a personal number associated therewith (e.g., 222-333-4444). The analysis component can determine that the caller is contacting the personal number, and can associate such caller (e.g., the number 111-222-3333) with metadata such that when the dual-mode handset is utilized to call the caller, a CLI relating to the personal number (e.g., 222-333-4444) will be provided. The relationships can be stored in the data repository 106 to enable subsequent association of a CLI and the number of the calling party.

Figure 9:
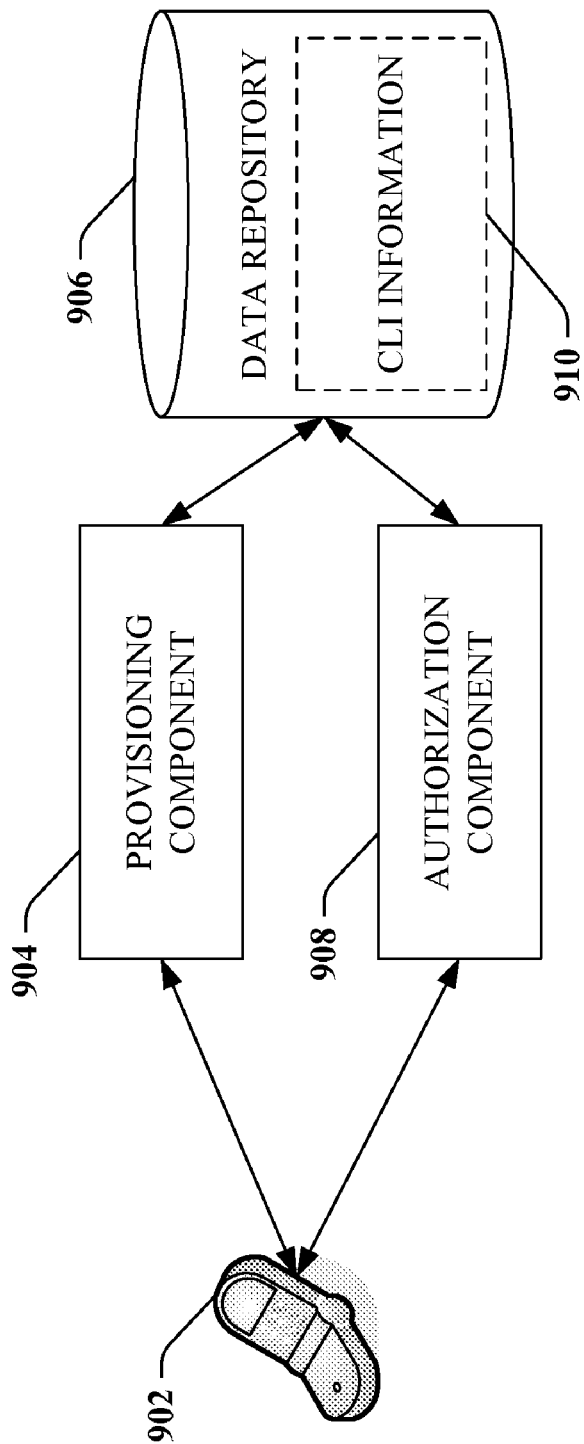
FIG. 9 is a block diagram of a system that performs authentication of a dual-mode handset.

With reference to FIG. 9, a system 900 that is related to authenticating a dual-mode handset and enabling the dual-mode handset to provide CLIs that vary with respect to certain called parties is illustrated. The system 900 includes a dual-mode handset 902 that accesses an authorization component 904 associated with a wireless network service provider (e.g., a GSM network). The authorization component 904 can analyze identifying indicia associated with the dual-mode handset 902 and access a data repository 906 to determine whether the dual-mode handset 902 is authorized with respect to the network and/or with respect to requested services. If the dual-mode handset is authorized 902, a provisioning component 908 can provide the dual-mode handset 902 with access to CLI information 910 within the data repository 906. Thereafter, when making a call, appropriate CLI information can be provided to the called party.

Referring to FIGS. 10-13, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 10:
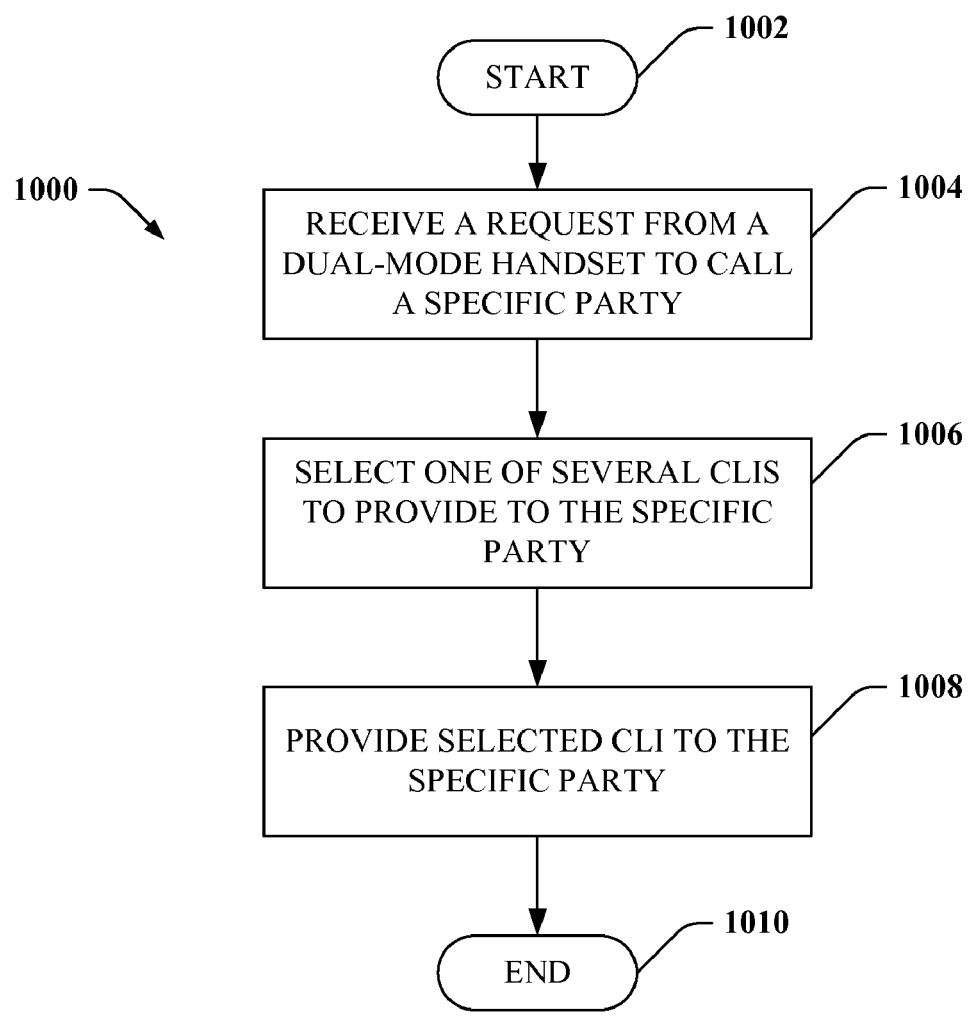
FIG. 10 is a representative flow diagram of a methodology that facilitates selectively providing a CLI from amongst multiple CLIs to a called party.

Turning specifically to FIG. 10, a methodology 1000 for associating one of many CLIs with an outgoing call is illustrated. The methodology 1000 starts at 1002, and at 1004 a dual-mode handset requests to make a call to a specific party, and such request is received. As stated above, the request can be a selection of a contact within a contact list, dialing a particular number, providing voice commands that relate to a certain number, or any other suitable manner for requesting that a call be made. Additionally, the dual-mode handset is associated with multiple phone numbers. At 1006, one of a plurality of CLIs is selected with respect to the specific party. For example, a CLI relating to a personal number can be selected if the specific party is a close friend of an owner of the dual-mode handset. Similarly, a CLI relating to a business number can be selected if the specific party is a business contact of the owner of the dual-mode handset. In yet another example, a default CLI can be selected if the specific party has not previously associated with a CLI. At 1008, the selected CLI is provided to the specific party, such that an operator of a phone can quickly discern an identity of the caller. The methodology 1000 then completes at 1010.

Figure 11:
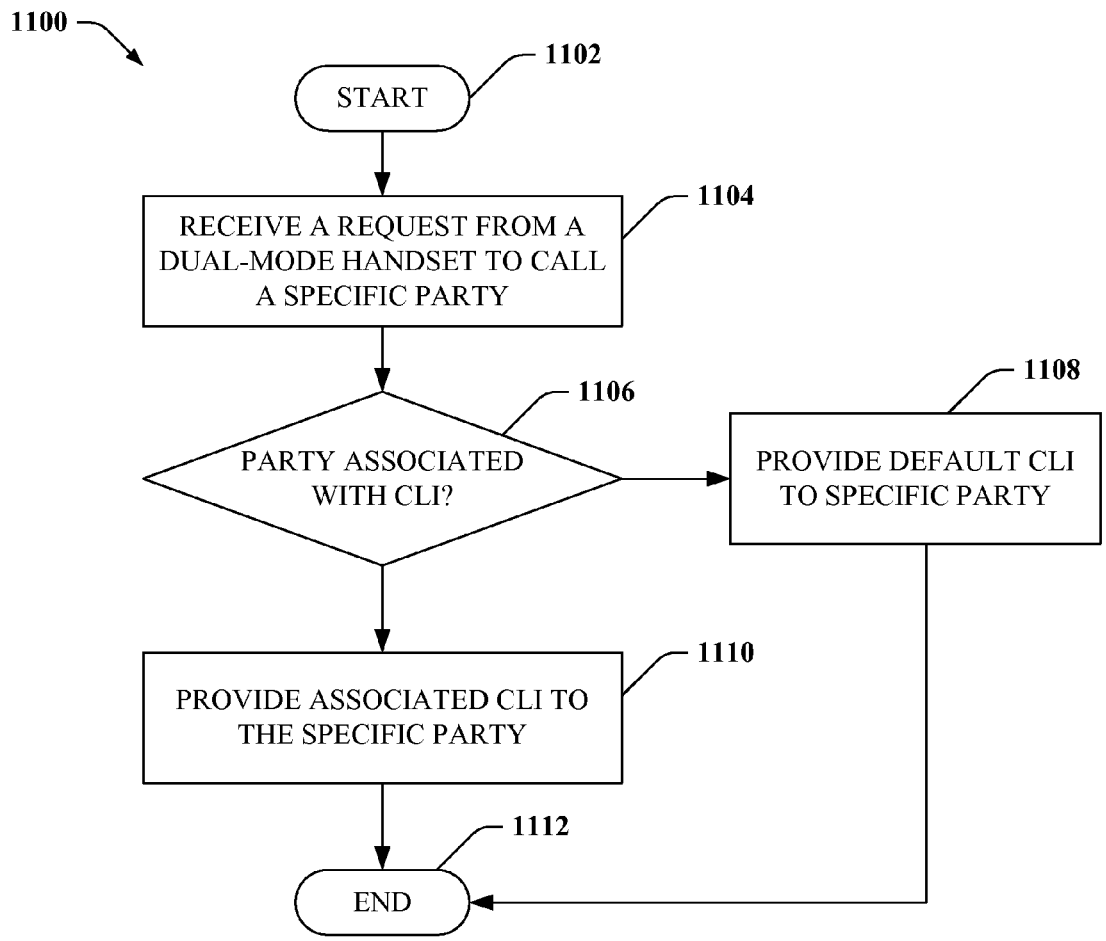
FIG. 11 is a representative flow diagram of a methodology for providing a default CLI to a called party.

With reference to FIG. 11, a methodology 1100 for providing an appropriate CLI from amongst a plurality of CLIs to a called party is illustrated. The methodology 1100 begins at 1102, and at 1104 a request from a dual-mode handset is received, wherein the request relates to calling a specific party. At 1106, a determination is made regarding whether the desirably called party is associated with a CLI. In more detail, the dual-mode handset can utilize multiple numbers to make and receive phone calls; thus, calls to different people may desirably be associated with different CLIs. Such associations can be made by a user, such as through creating contacts and placing them in particular categories (personal, business, family, etc.). Similarly, associations can be automatically created when individuals call the dual-mode handset (e.g., outgoing CLIs to such individual will be numbers previously dialed by the individual to contact the dual-mode handset).

If it is determined that there currently is no association between the specific party and a CLI, then at 1108 a default CLI can be provided to the specific party. Such default CLI can be set by a user or by a network provider associated with the dual-mode handset. If it is determined that there is an association between the specific party and a CLI, then such CLI can be provided to the specific party at 1110. The methodology 1100 then completes at 1112.

Figure 12:
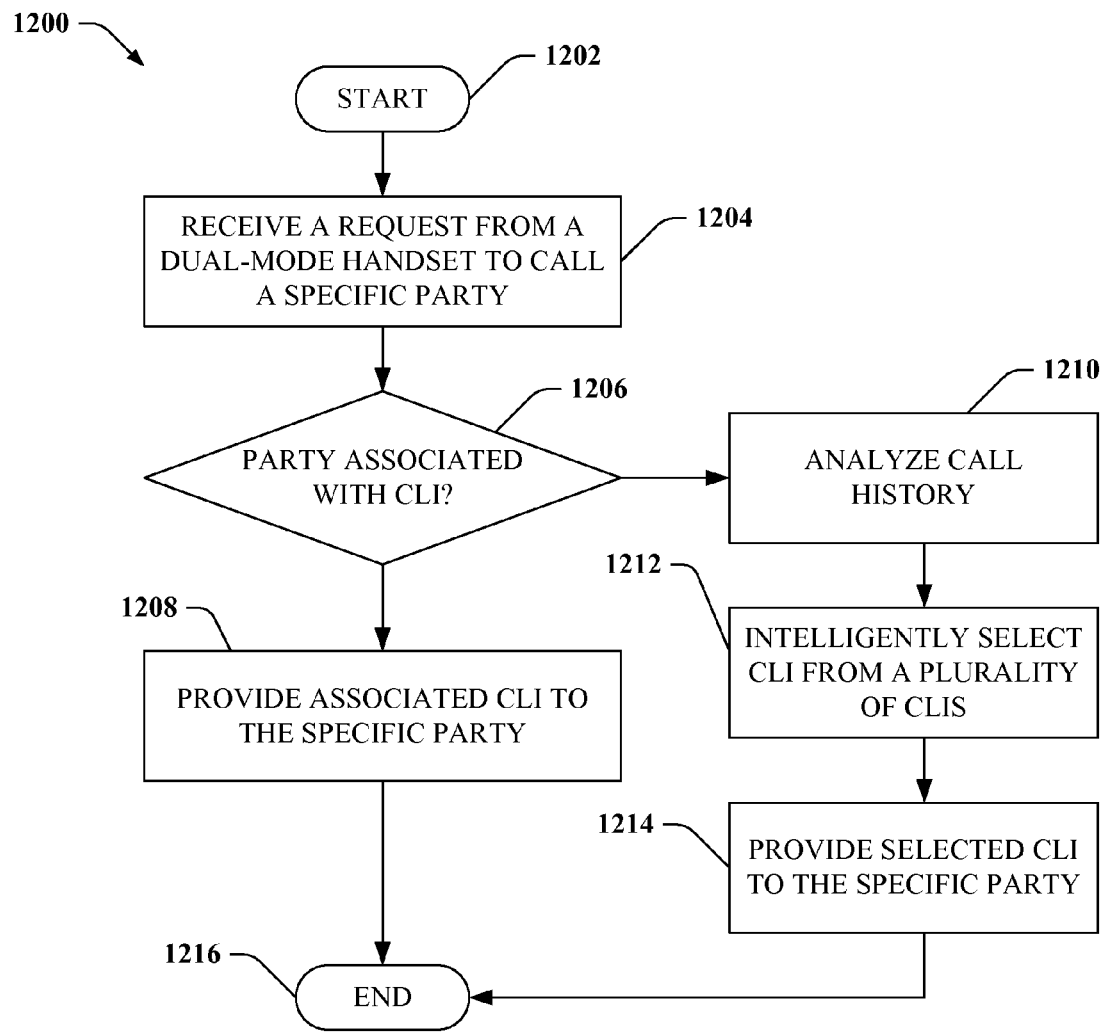
FIG. 12 is a representative flow diagram of a methodology for analyzing call history and intelligently providing a CLI to a called party based at least in part upon the analysis.

Referring now to FIG. 12, a methodology 1200 for selectively providing an appropriate CLI to a called party is illustrated. The methodology 1200 initiates at 1202, and at 1204 a request from a dual-mode handset to call a specific party is received. At 1206, a determination is made regarding whether the specific party is associated with a CLI. If the specific party is associated with a CLI (e.g., from previous calls made to the specific party or categorization of the specific party), then such CLI can be provided to the specific party at 1208. If the specific party is not associated with a CLI, then at 1210 call history of the dual-mode handset can be analyzed. For example, the call history can be reviewed to locate patterns regarding time of calling (e.g., between certain times of day it is highly probable that a business call is being made). Similarly, the call history can be analyzed to locate patterns regarding location of calls, such as area codes. More particularly, it may be more probable that numbers in a certain area code are personal contacts rather than business contacts. At 1212, a CLI is selected with respect to the specific party based at least in part upon the analysis of the call history, and at 1214 the selected CLI is provided to the specific party. The methodology 1200 can take place upon a dual-mode handset, upon a network server, a series of network servers, or any other suitable location. The methodology 1200 then completes at 1216.

Figure 13:
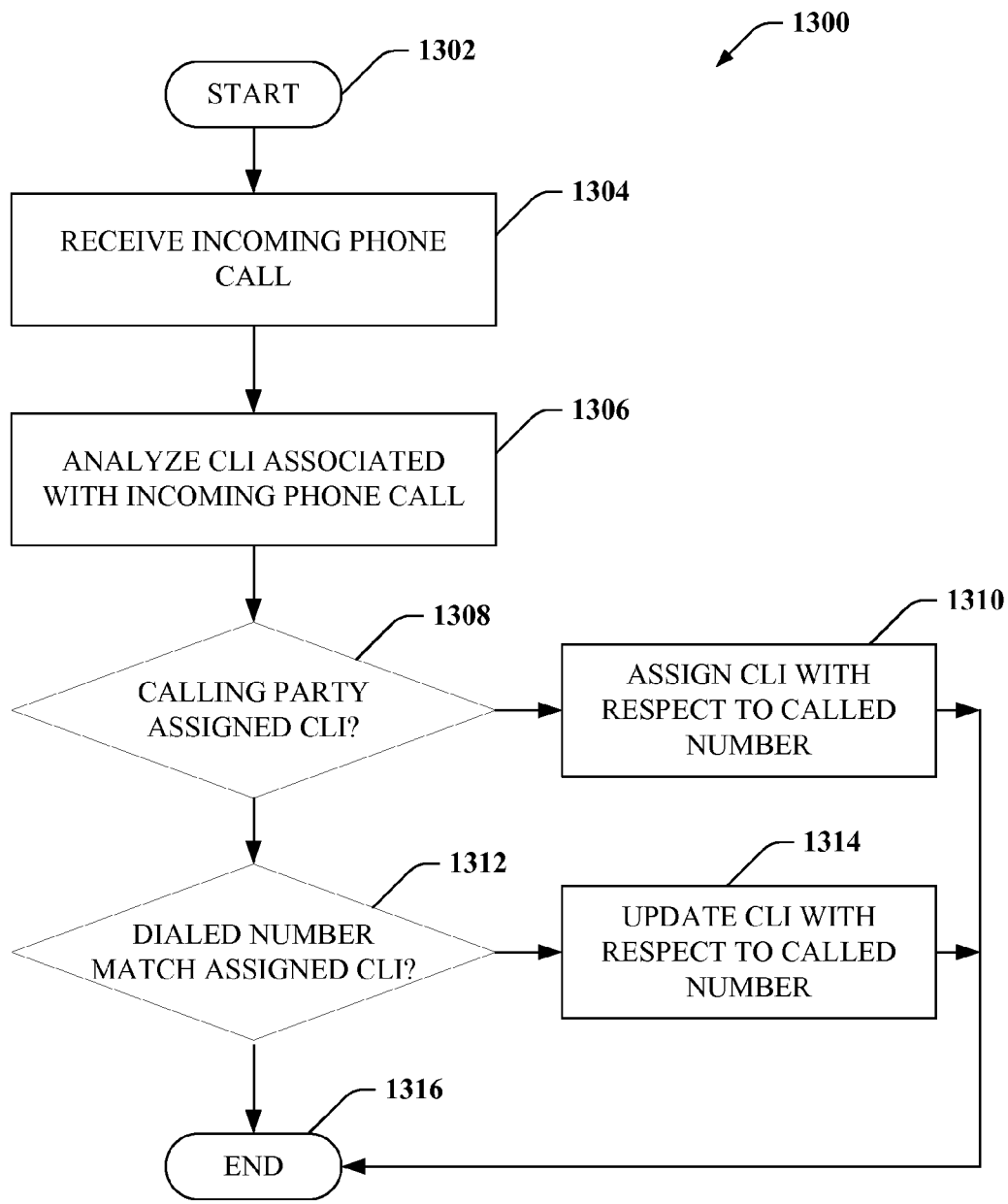
FIG. 13 is a representative flow diagram of a methodology for receiving a phone call and automatically assigning a CLI to the number associated with the received phone call.

Now turning to FIG. 13, a methodology 1300 for assigning a mobile terminated call with a CLI for later utilization in connection with mobile originating calls is illustrated. The methodology 1300 begins at 1302, and at 1304 an incoming phone call is received. The incoming phone call can be from a land line, a cellular phone, a call over a broadband network, or any other suitable call. Additionally, the incoming call can be directed towards a dual-mode handset that is associated with multiple numbers, such that dialing any of the multiple numbers results in the dual-mode handset receiving a call. At 1306, a CLI is analyzed with respect to the incoming call. For example, the CLI can indicate a certain number that is attempting to reach the dual-mode handset. At 1308, a determination is made regarding whether the party making the call (the calling party) has previously been assigned a CLI with respect to the dual-mode handset. In other words, if the dual-mode handset were to call the calling party, would a CLI be associated with the calling party.

If the calling party has not been assigned a CLI with respect to the dual-mode handset, then the calling number is associated with a CLI relating to the number called at 1310. For instance, the dual-mode handset may be associated with a personal number and a business number, and the calling party may have called the personal number. Thereafter, if the dual-mode handset is utilized to contact the calling party, a CLI relating to the personal number will be provided to such calling party. If the calling party has previously been assigned a CLI with respect to the dual-mode handset, then at 1312 a determination is made regarding whether such CLI matches the CLI previously assigned. If the CLIs do not match, at 1314 a CLI relating to the calling party is updated with respect to the number called. Pursuant to an example, the calling party may have previously called the dual-mode handset using the personal number. Over time, however, the calling party may become a business contact and begin contacting the subscriber associated with the dual-mode handset through use of the business number. Accordingly, if the dual-mode handset is utilized to contact the calling party, a CLI associated therewith may desirably be the business-related CLI. Additionally or alternatively, CLIs associated with parties may vary with time. For instance, during working hours a number may desirably be associated with a business CLI while during evening hours the same number may desirably be associated with a personal CLI. If it is determined at 1312 that the CLIs match, then there is no need to perform any updating and the methodology 1300 completes at 1316.

Figure 14:
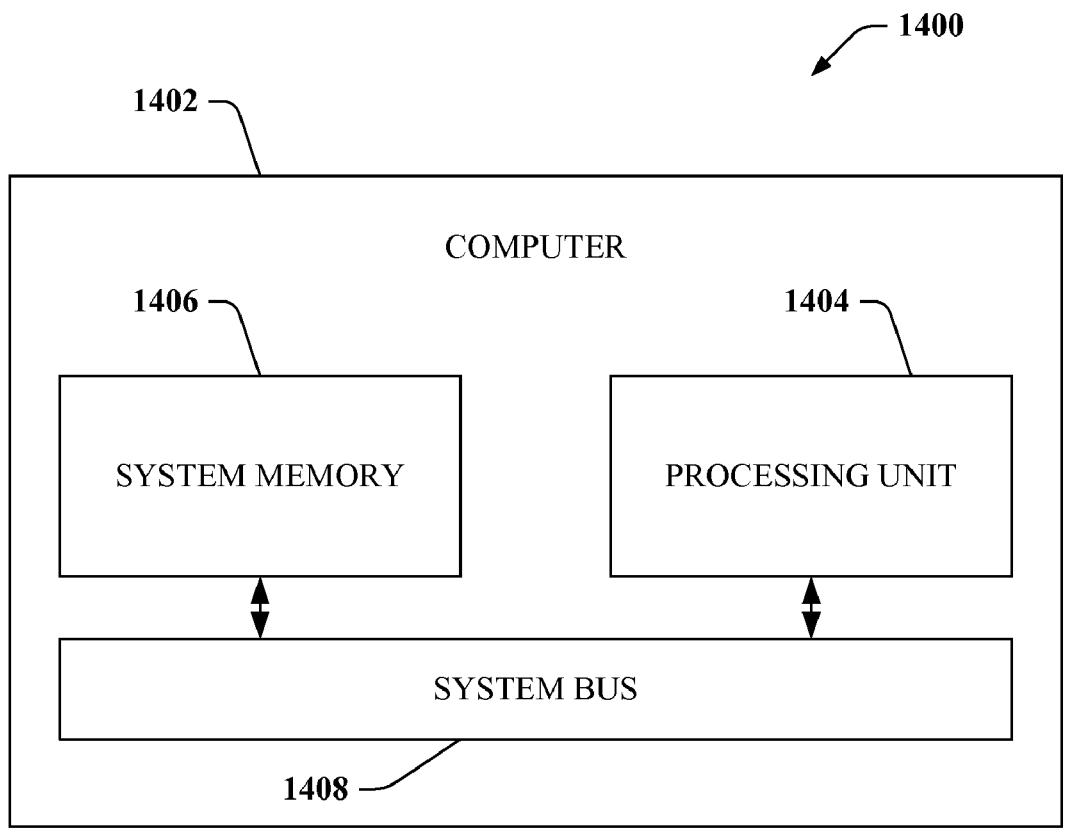
FIG. 14 is an example computing environment that can be employed in connection with various aspects described herein.

Referring now to FIG. 14, there is illustrated a block diagram of a computer operable to analyze incoming and outgoing calls from a dual-mode handset and associate appropriate CLIs therewith. While shown through use of a computer or computing components, it is understood that the claimed subject matter may be implemented as a method, apparatus, or article of manufacture using standard programming and/or engineering techniques to produce software, firmware, hardware, or any combination thereof to control a computing device, such as a mobile handset, to implement the disclosed subject matter. The term "article of manufacture" as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, SIM cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In order to provide additional context for various aspects of the claimed subject matter, FIG. 14 and the following discussion are intended to provide a brief, general description of a suitable computing environment 1400 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the exemplary environment 1400 for implementing various aspects includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors, such a single core processor, a multi-core processor, or any other suitable arrangement of processors.

The system bus 1408 can be any of several types of bus structure that may further interconnect to a memory bus (with or without a memory controller), a peripheral bus, and a local bus using any of a variety of commercially available bus architectures. The system memory 1406 can include read-only memory (ROM), random access memory (RAM), high-speed RAM (such as static RAM), EPROM, EEPROM, and/or the like. Additionally or alternatively, the computer 1402 can include a hard disk drive, upon which program instructions, data, and the like can be retained. Moreover, removable data storage can be associated with the computer 1402. Hard disk drives, removable media, etc. can be communicatively coupled to the processing unit 1404 by way of the system bus 1408.

The system memory 1406 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1402 through one or more wired/wireless input devices, such as a keyboard, pointing and clicking mechanism, pressure sensitive screen, microphone, joystick, stylus pen, etc. A monitor or other type of interface can also be connected to the system bus 1408.

The computer 1402 may operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1402 can connect to other devices/networks by way of antenna, port, network interface adaptor, wireless access point, modem, and/or the like.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 15:
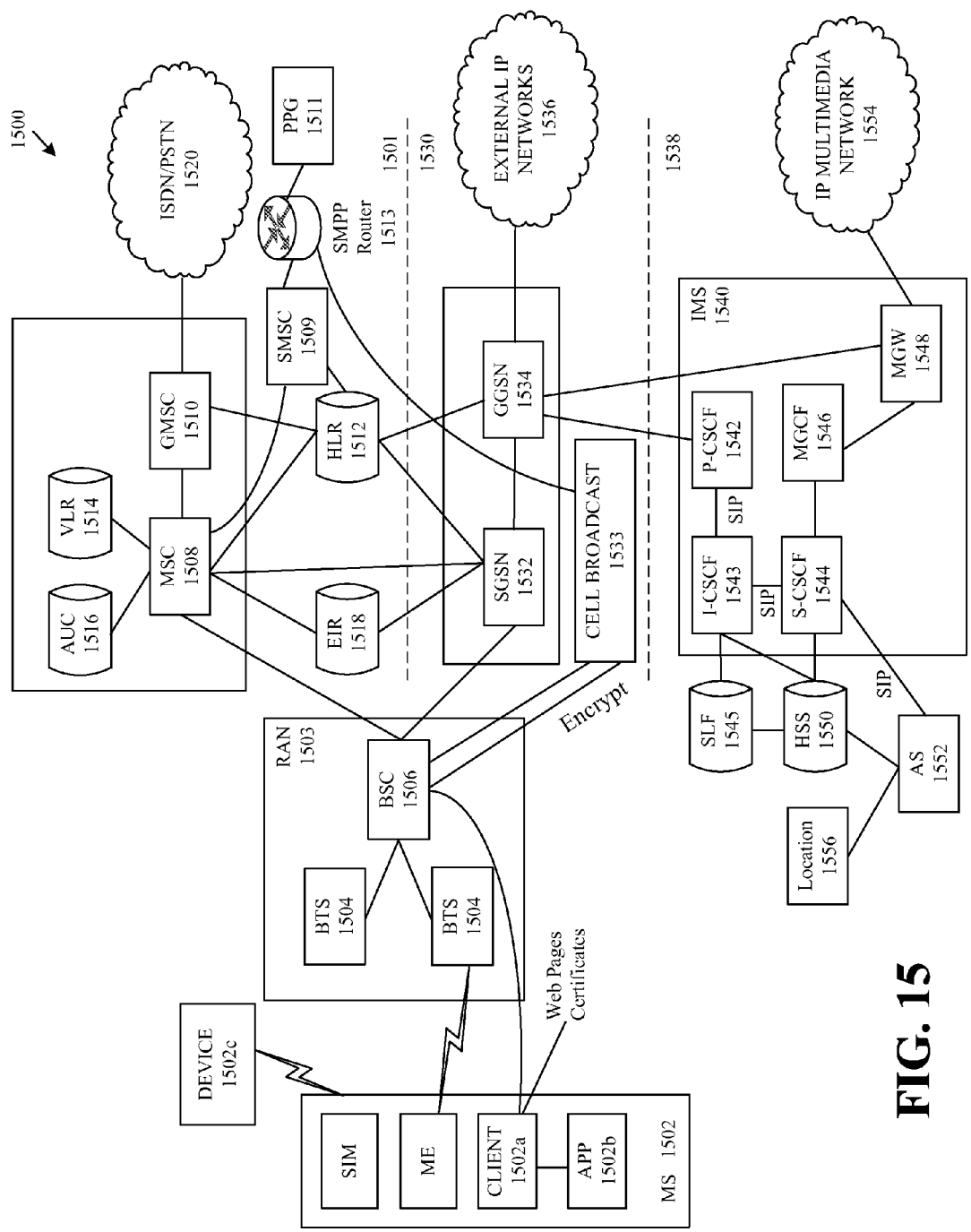
FIG. 15 is an example networking environment.

Now turning to FIG. 15, such figure depicts a GSM/GPRS/IP multimedia network architecture 1500 that includes a GSM core network 1501, a GPRS network 1530 and an IP multimedia network 1538. The GSM core network 1501 includes a Mobile Station (MS) 1502, at least one Base Transceiver Station (BTS) 1504 and a Base Station Controller (BSC) 1506. The MS 1502 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1502 includes an embedded client 1502a that receives and processes messages received by the MS 1502. The embedded client 1502a may be implemented in JAVA and is discuss more fully below.

The embedded client 1502a communicates with an application 1502b that provides services and/or information to an end user. One example of the application may be navigation software that provides near real-time traffic information that is received via the embedded client 1502a to the end user. The navigation software may provide road conditions, suggest alternate routes, etc. based on the location of the MS 1502. Those of ordinary skill in the art understand that there are many different methods and systems of locating an MS 1502.

Alternatively, the MS 1502 and a device 1502c may be enabled to communicate via a short-range wireless communication link, such as BLUETOOTH. For example, a BLUETOOTH SIM Access Profile may be provided in an automobile (e.g., device 1502c) that communicates with the SIM in the MS 1502 to enable the automobile's communications system to pull information from the MS 1502. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1502c. There may be an endless number of devices 1502c that use the SIM within the MS 1502 to provide services, information, data, audio, video, etc. to end users.

The BTS 1504 is physical equipment, such as a radio tower, that enables a radio interface to communicate with the MS. Each BTS may serve more than one MS. The BSC 1506 manages radio resources, including the BTS. The BSC may be connected to several BTSs. The BSC and BTS components, in combination, are generally referred to as a base station (BSS) or radio access network (RAN) 1503.

The GSM core network 1501 also includes a Mobile Switching Center (MSC) 1508, a Gateway Mobile Switching Center (GMSC) 1510, a Home Location Register (HLR) 1512, Visitor Location Register (VLR) 1514, an Authentication Center (AuC) 1518, and an Equipment Identity Register (EIR) 1516. The MSC 1508 performs a switching function for the network. The MSC also performs other functions, such as registration, authentication, location updating, handovers, and call routing. The GMSC 1510 provides a gateway between the GSM network and other networks, such as an Integrated Services Digital Network (ISDN) or Public Switched Telephone Networks (PSTNs) 1520. In other words, the GMSC 1510 provides interworking functionality with external networks.

The HLR 1512 is a database or component(s) that comprises administrative information regarding each subscriber registered in a corresponding GSM network. The HLR 1512 also includes the current location of each MS. The VLR 1514 is a database or component(s) that contains selected administrative information from the HLR 1512. The VLR contains information necessary for call control and provision of subscribed services for each MS currently located in a geographical area controlled by the VLR. The HLR 1512 and the VLR 1514, together with the MSC 1508, provide the call routing and roaming capabilities of GSM. The AuC 1516 provides the parameters needed for authentication and encryption functions. Such parameters allow verification of a subscriber's identity. The EIR 1518 stores security-sensitive information about the mobile equipment.

A Short Message Service Center (SMSC) 1509 allows one-to-one Short Message Service (SMS) messages to be sent to/from the MS 1502. A Push Proxy Gateway (PPG) 1511 is used to "push" (e.g., send without a synchronous request) content to the MS 1502. The PPG 1511 acts as a proxy between wired and wireless networks to facilitate pushing of data to the MS 1502. A Short Message Peer to Peer (SMPP) protocol router 1513 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1502 sends a location update including its current location information to the MSC/VLR, via the BTS 1504 and the BSC 1506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1530 is logically implemented on the GSM core network architecture by introducing two packet-switching network nodes, a serving GPRS support node (SGSN) 1532, a cell broadcast and a Gateway GPRS support node (GGSN) 1534. The SGSN 1532 is at the same hierarchical level as the MSC 1508 in the GSM network. The SGSN controls the connection between the GPRS network and the MS 1502. The SGSN also keeps track of individual MS's locations and security functions and access controls.

A Cell Broadcast Center (CBC) 1533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1534 provides a gateway between the GPRS network and a public packet network (PDN) or other IP networks 1536. That is, the GGSN provides interworking functionality with external networks, and sets up a logical link to the MS through the SGSN. When packet-switched data leaves the GPRS network, it is transferred to an external TCP-IP network 1536, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1538 was introduced with 3GPP Release 5, and includes an IP multimedia subsystem (IMS) 1540 to provide rich multimedia services to end users. A representative set of the network entities within the IMS 1540 are a call/session control function (CSCF), a media gateway control function (MGCF) 1546, a media gateway (MGW) 1548, and a master subscriber database, called a home subscriber server (HSS) 1550. The HSS 1550 may be common to the GSM network 1501, the GPRS network 1530 as well as the IP multimedia network 1538.

The IP multimedia system 1540 is built around the call/session control function, of which there are three types: an interrogating CSCF (I-CSCF) 1543, a proxy CSCF (P-CSCF) 1542, and a serving CSCF (S-CSCF) 1544. The P-CSCF 1542 is the MS's first point of contact with the IMS 1540. The P-CSCF 1542 forwards session initiation protocol (SIP) messages received from the MS to an SIP server in a home network (and vice versa) of the MS. The P-CSCF 1542 may also modify an outgoing request according to a set of rules defined by the network operator (for example, address analysis and potential modification).

The I-CSCF 1543 forms an entrance to a home network and hides the inner topology of the home network from other networks and provides flexibility for selecting an S-CSCF. The I-CSCF 1543 may contact a subscriber location function (SLF) 1545 to determine which HSS 1550 to use for the particular subscriber, if multiple HSS's 1550 are present. The S-CSCF 1544 performs the session control services for the MS 1502. This includes routing originating sessions to external networks and routing terminating sessions to visited networks. The S-CSCF 1544 also decides whether an application server (AS) 1552 is required to receive information on an incoming SIP session request to ensure appropriate service handling. This decision is based on information received from the HSS 1550 (or other sources, such as an application server 1552). The AS 1552 also communicates to a location server 1556 (e.g., a Gateway Mobile Location Center (GMLC)) that provides a position (e.g., latitude/longitude coordinates) of the MS 1502.

The HSS 1550 contains a subscriber profile and keeps track of which core network node is currently handling the subscriber. It also supports subscriber authentication and authorization functions (AAA). In networks with more than one HSS 1550, a subscriber location function provides information on the HSS 1550 that contains the profile of a given subscriber.

The MGCF 1546 provides interworking functionality between SIP session control signaling from the IMS 1540 and ISUP/BICC call control signaling from the external GSTN networks (not shown). It also controls the media gateway (MGW) 1548 that provides user-plane interworking functionality (e.g., converting between AMR- and PCM-coded voice). The MGW 1548 also communicates with other IP multimedia networks 1554.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A caller identity provision system having a memory having stored therein computer-executable instructions configured to implement the caller identity system, comprising:
    a receiver component that receives a request from a calling party to place a call to a called party, the call request originates from a mobile handset that is associated with multiple numbers; and
    an analysis component that analyzes the call request and selects a calling line identification (CLI) from amongst a plurality of CLIs to provide to the called party that is a subject of the call request from the calling party and analyzes call history of the mobile handset and selects the CLI from amongst the plurality of CLIs based at least in part upon stored events associated with the CLI within a contact list of the mobile handset.

2. The system of claim 1, the mobile handset comprises the receiver component and the analysis component.

3. The system of claim 1, a network server maintained by a wireless service provider comprises the receiver component and the analysis component.

4. The system of claim 3, the network server is within a GSM network.

5. The system of claim 1, the analysis component accesses a data repository to determine whether the called party has previously been assigned a CLI.

6. The system of claim 5, the mobile handset comprises the data repository.

7. The system of claim 5, a network server maintained by a wireless service provider comprises the data repository.

8. The system of claim 1, the plurality of CLIs includes at least a CLI associated with a personal number and a CLI associated with a business number.

9. The system of claim 1, further comprising an interface generator that creates a mechanism that enables a user of the mobile handset to associate the called party with a CLI prior to connecting a call.

10. The system of claim 9, the mechanism is a graphical user interface, the CLI is associable with the called party by depressing one or more keys.

11. The system of claim 9, the mechanism is a graphical user interface, the CLI is associable with the called party through use of voice commands.

12. The system of claim 9, the mechanism is a graphical user interface, the CLI is associable with the called party through use of a pressure-sensitive screen.

13. The system of claim 1, further comprising a billing component that bills a first rate for calls associated with a first CLI and a second rate for calls associated with a second CLI.

14. The system of claim 1, further comprising a billing component that bills a first subscriber for calls associated with a first CLI and a second subscriber for calls associated with a second CLI.

15. The system of claim 1, the analysis component analyzes call history of the mobile handset and dynamically and intelligently selects the CLI based at least in part upon the analysis if the call request is associated with a number that has not been associated with a CLI within a contact list of the mobile handset.

16. The system of claim 15, the analysis component determines correlations between previously dialed numbers and the call request in connection with selecting the CLI.

17. The system of claim 1, wherein the mobile handset is a dual-mode handset.

18. The system of claim 1, a tagging component that tags the CLI with metadata that enables association of a CLI and a number of the calling party.

19. The system of claim 1, wherein the calling party designates CLIs with respect to individuals within a contact list of the mobile handset.

20. A method for selecting a calling line identification (CLI) to associate with a mobile-originated call, comprising:

receiving a request to make the mobile-originated call to a called party from a calling party, the request originates from a mobile handset that is associated with multiple telephone numbers;

determining if the called party is associated with a CLI from one of the multiple telephone numbers;

selecting a CLI associated with the called party if the called party is associated with a CLI; and analyzing call history of the mobile handset and selecting the CLI based at least in part upon the stored events associated with a CLI within a contact list of the mobile handset if the called party is not associated with a CLI.

21. The method of claim 20, further comprising providing the selected CLI to a subject of the call request.

22. The method of claim 20, further comprising selecting a default CLI if a subject of the call request has not previously been associated with a CLI.

23. The method of claim 20, further comprising selecting the CLI based upon user instructions.

24. The method of claim 20, further comprising selecting the CLI based at least in part upon previous user categorizations of multiple contacts.

25. The method of claim 20, further comprising receiving the request on a dual-mode handset.

26. The method of claim 20, wherein analyzing call history of the mobile handset comprises locating patterns regarding at least one of time of calling or location of calls.

27. A calling line identification (CLI) provision system, comprising:

means for receiving a call request from a mobile handset to place the call to a called party, the mobile handset is assigned multiple telephone numbers, wherein multiple CLIs are associated with the multiple telephone numbers, respectively;

means for selecting a CLI from the multiple CLIs to provide to the called party that is a subject of the call request;

means for analyzing call history of the mobile handset and selecting the CLI from the multiple CLIs based at least in part upon the stored events associated with a CLI within a contact list of the mobile handset analysis if the called party is not associated with a CLI; and means for providing the subject of the call request with the selected CLI.

28. The system of claim 27, further comprising means for billing a subscriber as a function of the selected CLI.

* * * * *